United States Patent
Georg

[19]
[11] Patent Number: 6,044,949
[45] Date of Patent: Apr. 4, 2000

[54] PRESSURE PLATE COMPONENT GROUP

[75] Inventor: Kraus Georg, Bergrheinfeld, Germany

[73] Assignee: Mannesmann Sachs AG, Schweinfurt, Germany

[21] Appl. No.: 09/154,973

[22] Filed: Sep. 17, 1998

[30] Foreign Application Priority Data

Sep. 17, 1997 [DE] Germany .................. 197 40 809

[51] Int. Cl.[7] .................................................. F16D 13/75
[52] U.S. Cl. ................................. 192/70.25; 192/111 R
[58] Field of Search ........................ 192/70.25, 111 R, 192/89.23, 111 B, 111 A, 30 W

[56] References Cited

U.S. PATENT DOCUMENTS

| | | | |
|---|---|---|---|
| 4,086,995 | 5/1978 | Spokas | 192/111 B |
| 4,207,972 | 6/1980 | Zeidler | 192/111 A |
| 4,228,883 | 10/1980 | Palmer | 192/111 A |
| 5,513,735 | 5/1996 | Uenohara | 192/111 A |
| 5,560,463 | 10/1996 | Link et al. | 192/70.25 |
| 5,634,541 | 6/1997 | Maucher | 192/70.25 |
| 5,690,203 | 11/1997 | Link et al. | 192/70.25 |
| 5,715,921 | 2/1998 | Link et al. | 192/70.25 |
| 5,816,379 | 10/1998 | De Briel et al. | 192/70.25 |
| 5,845,750 | 12/1998 | De Briel et al. | 192/70.25 |

FOREIGN PATENT DOCUMENTS

| | | |
|---|---|---|
| 2605692 | 4/1988 | France . |
| 2314893 | 1/1998 | United Kingdom . |

*Primary Examiner*—Rodney H. Bonck
*Attorney, Agent, or Firm*—Cohen, Pontani, Lieberman & Pavane

[57] ABSTRACT

A pressure plate component group having, a manually operable wear readjustment device with an operating section embodied for interaction with a readjustment tool and also a readjustment section that interacts with a wear compensation device to compensate for wear that occurs, during clutch operation, on the friction linings of a clutch disk that are clamped or clampable between a pressure plate and a flywheel.

11 Claims, 1 Drawing Sheet

PRESSURE PLATE COMPONENT GROUP

BACKGROUND OF THE INVENTION

1. Field of the Invention

The present invention relates to a pressure plate component group, particularly for a motor vehicle friction clutch with wear compensation. More particularly, the invention relates to a component group having a housing attachable or attached to a flywheel for common rotation around a rotational axis, and a pressure plate arranged in rotation-proof fashion in the housing and axially movable relative thereto. An energy storage device, preferably a diaphragm spring, is supported on the housing, on the one hand, and on the pressure plate, on the other, and presses the pressure plate toward a side of the housing that is provided for connection to the to flywheel. A wear compensation device is arranged in the support path of the energy storage device. At least one compensation element is prestressed in the wear compensation device and can be moved for the purpose of wear compensation.

2. Discussion of the Prior Art

Such pressure plate component groups, for the purpose of carrying out wear compensation, are embodied so as to comprise, further, at least one clearance indicator, which detects the wear that has occurred, during the operation of a motor vehicle friction clutch equipped with such a pressure plate component group, in the area of the friction linings of the clutch disk. For example, such wear can be detected by a clearance indicator striking against the flywheel and the corresponding movement, e.g., relative to the pressure plate and thus relative to the wear compensation device. In these known pressure plate component groups, the wear that occurs during clutch operation is always detected by the relative movement between two components of the motor vehicle friction clutch or of the pressure plate component group. Relatively expensive measures must therefore be taken to permit such wear detection. These measures include, for example, the aforementioned provision of components on the pressure plate component group that extend, for the purpose of wear detection, to the flywheel. These components are generally arranged radially outside of the area where the friction linings of the clutch disk, and thus the opposed friction surfaces of the pressure plate and the flywheel, are located. The result is a radial enlargement of the entire pressure plate component group or motor vehicle friction clutch solely for the purpose of providing the wear detection arrangement.

SUMMARY OF THE INVENTION

In contrast, the object of the present invention is to provide a pressure plate component group, which, while providing a means of wear compensation, has an overall configuration, particularly a structural size, that is substantially unaffected by the provision of the wear compensation means.

According to the invention, this object is attained by a pressure plate component group, particularly for a motor vehicle friction clutch with wear compensation, which comprises a housing attached or attachable to a flywheel for common rotation around a rotational axis, a pressure plate arranged in rotation-proof fashion in the housing and axially movable relative thereto, an energy storage device, preferably a diaphragm spring, which is supported on the housing, on the one hand, and on the pressure plate, on the other, and which presses the pressure plate toward a side of the housing that is provided for connection to the flywheel, and a wear compensation device, arranged in the support path of the energy storage device, with at least one compensation element that is prestressed in a wear compensation device and can be moved for the purpose of wear compensation.

Also provided in the pressure plate component group according to the invention is at least one manually operable wear readjustment device, which has an operating section preferably embodied for interaction with a readjustment tool, and also has a readjustment section that interacts with the wear compensation device to compensate for the wear that has occurred during clutch operation on the friction linings of a clutch disk that are clamped or clampable between the pressure plate and the flywheel.

Because the pressure plate compensation device according to the invention calls for a manually operable wear readjustment device, it is possible to dispense with mechanisms that detect, in a more or less complicated manner, the wear that has occurred during clutch operation and lead automatically to a corresponding compensation. Because it is possible to do without such relatively complicated mechanisms in the pressure plate component group according to the invention, no requirements or limitations imposed by such wear detection mechanisms arise to during the construction of this pressure plate component group or a motor vehicle friction clutch equipped with this pressure plate component group. In addition, in the pressure plate component group according to the invention, there is no danger of wear compensation becoming impossible to implement, for example, if a clearance indicator arrangement of the prior art malfunctions and can no longer provide wear compensation, so that, as a result, the energy storage device, e.g., the diaphragm spring, moves out of a certain target operating region, with a corresponding change in its spring characteristic. Instead, the invention, by providing a manually operable wear readjustment device, permits manual and thus certain readjustment for wear to be carried out, for example, in connection with maintenance work performed at periodic intervals or at intervals determined by the actual operational time. Thus, the energy storage device can always be kept in its optimal working area. Because the correlation between the actual operational time or kilometers travelled by a vehicle, for example, and the wear and tear on the friction linings of a clutch disk is well known, it can be reliably ensured that wear compensation will be carried out in a timely manner, even without a direct determination of the wear that has occurred.

In a very advantageous embodiment of the invention, the wear compensation device has, as the compensation element, at least one ring element, which surrounds the rotational axis and, for the purpose of wear compensation, can be rotated around the rotational axis and thereby moved in the direction of the rotational axis. Because such a ring element is generally pressurized during the operation of the pressure plate component group by the energy storage device, and because the wear readjustment device, with its readjustment section, is only required to limit the extent of rotation of the ring element around the rotational axis, and thus the extent of axial lengthening of the wear compensation device, when wear compensation is carried out, the provision of a single wear readjustment device is sufficient. In other words, it is not necessary to provide several wear readjustment devices distributed in the circumferential direction that interact with corresponding readjustment sections on the ring element, i.e., the wear compensation device, although such an embodiment is possible for the pressure plate component group according to the invention.

Since, as discussed above, the pressure plate component group according to the invention requires no components that must detect the occurrence of wear relative to other components of a motor vehicle friction clutch, e.g., the flywheel, it is proposed that the wear readjustment device, of which there is at least one, have no components projecting axially via a friction surface of the pressure plate in the direction of a side of the housing. In other words, the danger no longer exists that, prior to the assembly of the pressure plate component group with a flywheel, components of the wear readjustment device might be unintentionally moved by the unnoticed placement of the pressure plate component group on the friction surface areas of the pressure plate. Thus, it is possible to dispense with axial securing means for the wear readjustment device.

Further, by omitting any components that detect wear relative to the flywheel, for example, the pressure plate component group according to the invention permits an arrangement wherein the wear readjustment device(s) has substantially no components projecting outward in the radial direction relative to the rotational axis over the friction surface of the pressure plate or at the radially outer end area of the clutch disk.

The wear readjustment device(s) of the pressure plate component group according to the invention can be constructed so as to encompass a bolt element that penetrates a through opening in the pressure plate and carries a lever section, which forms the readjustment device and acts on the wear compensation device. The bolt element is thereby preferably pressed into a friction clamping seat in the opening by means of the interaction of the lever element with the wear compensation device.

In order to keep the radial structural size of the pressure plate component group according to the invention as small as possible, as discussed above, the through opening lies substantially radially inside a radially outer end of the friction surface of the pressure plate or the friction linings of the clutch disk.

Preferably, the bolt element has an end section that penetrates a housing through opening and, in its area projecting outward over the housing, forms at least a part of the operating section.

The bolt element can have a tool contact formation on its area projecting over the housing. This tool contact formation can comprise at least one radial projection with a tool support surface lying in the direction of the housing, whereby a predetermined distance is provided in a bolt longitudinal direction between the tool support surface and an opposed housing surface region. This predetermined distance is preferably embodied so as to be, in an operating state or activation state of the pressure plate component group corresponding to the disengaged state, greater than the thickness of one blocking section of the readjustment tool and, in an operating state of the pressure plate component group corresponding to an engaged state, smaller than or equal to the thickness of the blocking section.

In the pressure plate component group according to the invention, it is preferably possible, after the operating section is brought into engagement with the readjustment tool, in the operating state of the pressure plate component group that corresponds to the disengaged state, to prevent the bolt element, at least partially, from moving with the pressure plate in the direction of the first side of the housing upon a subsequent engagement process, and to do so preferably by means of contact between the readjustment tool (which is engaged with the tool contact formation) and the surface region of the housing.

The present invention also relates to a motor vehicle friction clutch with a pressure plate component group according to the invention.

The present invention further relates to a process for compensating for wear that occurs, during clutch operation, on the friction linings of a clutch disk of a motor vehicle friction clutch, especially a motor vehicle friction clutch with a pressure plate component group according to the invention, comprising the following steps:

a) Disengaging of the motor vehicle friction clutch;

b) With the motor vehicle friction clutch in the disengaged state, engaging a readjustment tool with a tool contact formation located on a component of a wear readjustment device;

c) Engaging the motor vehicle friction clutch, whereby, the components of the wear readjustment device are prevented at least partially, from moving with a component of the pressure plate component group, for the purpose of bringing the components of the wear readjustment device into a position relative to a wear compensation device that corresponds to the wear that has occurred; and d) Renewed disengaging of the motor vehicle friction clutch, so as to relieve the wear compensation device and allow its axial expansion for the purpose of wear compensation, until further axial expansion is prevented by the wear readjustment device.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figures 1, 2:
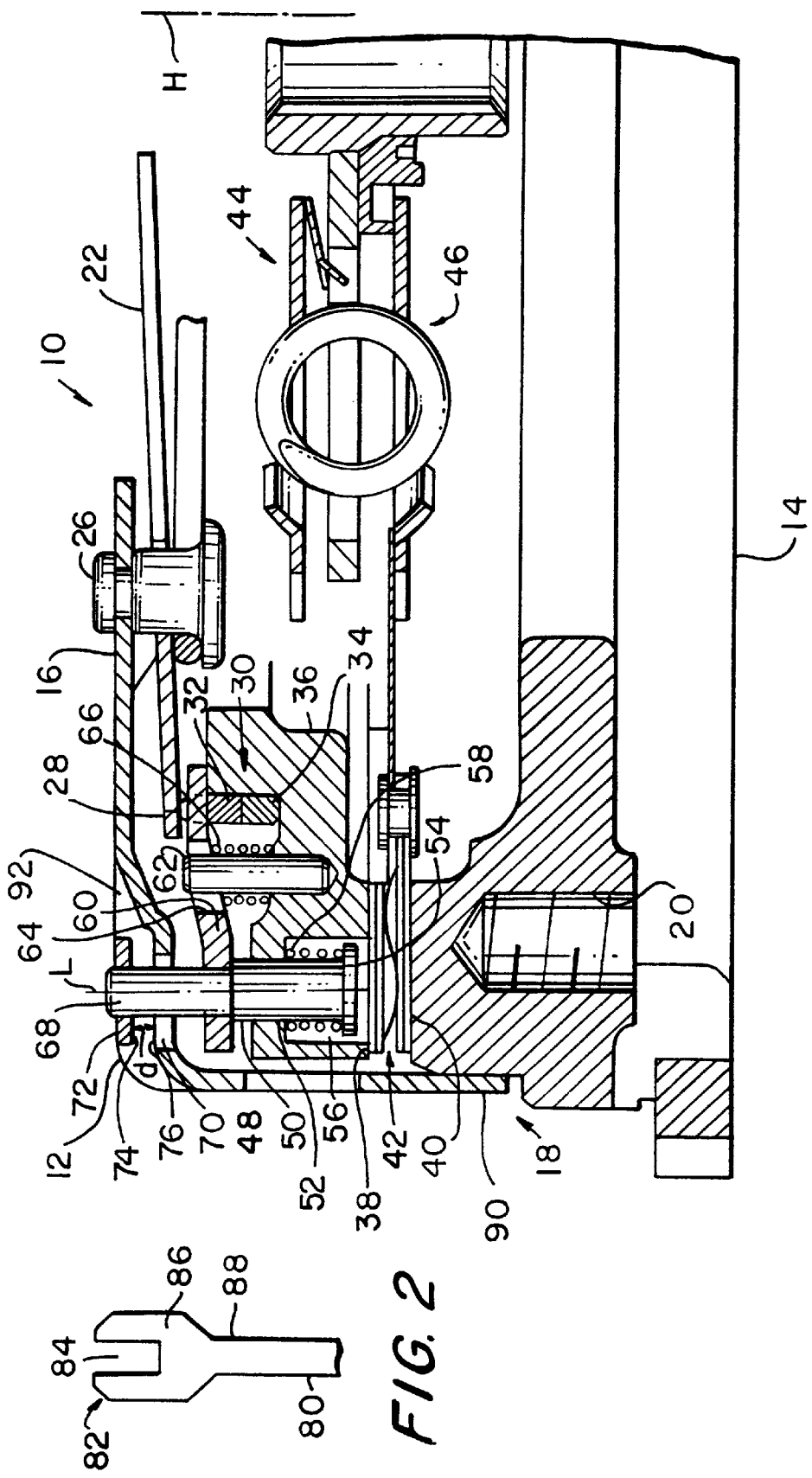
FIG. 1 is a partial longitudinal section through a motor vehicle friction clutch.
FIG. 2 is a view of a readjustment tool that can be used for wear compensation in the motor vehicle friction clutch shown in FIG. 1.

FIG. 1 shows a motor vehicle friction clutch 10, which has a pressure plate component group 12 that is attached to a flywheel 14. The pressure plate component group 12 has a housing 16, which is open on one axial side 18 and is securely connected on this open side 18 in modular fashion to the flywheel 14 by welding or the like. The clutch module formed from the pressure plate component group 12 and the flywheel 14 is attached in a known manner to the crank shaft of an internal combustion engine, e.g., via a radial flange and attachment screws that penetrate the flange and are screwed into screw receptacle openings 20. The clutch module is rotatable together with the crank shaft around a rotational axis A.

The pressure plate component group 12 further comprises a diaphragm spring 22 arranged in the housing 16 as a energy storage device. The diaphragm spring 22 is supported in a radially central area via bolts 26 on the housing 16 and, in its radially outer area 28, presses a wear compensation device 30. In the illustrated embodiment, the wear compensation device 30 comprises two ring elements 32, 34. The ring element 32 is directly pressed by the diaphragm spring 22, and the ring element 34 is supported on a pressure plate 36 of the pressure plate component group 12. The pressure plate 36 is held in a known manner in the housing 16 in a rotation-proof but axially movable manner.

The two ring elements 32, 34 have, on their reciprocal supporting surfaces, saw-toothed slanted surface regions, so that, given a relative rotation between the two ring elements 32, 34, their opposed slanted surface regions slide on each other and thereby cause an axial expansion, i.e., a lengthening, of the wear compensation device 30. Prestress springs (not shown in FIG. 1) act between the ring elements 32, 34, and prestress the ring elements 32, 34 in a wear compensation direction, i.e., in a direction that leads, as a result of the aforementioned mutual sliding of the slanted surfaces, to an axial expansion of the wear compensation device 30. In the case of the wear compensation device 30, for example, the ring element 32 can be held in a rotation-proof fashion relative to the housing, i.e., relative to the diaphragm spring 22, while the ring element 34 can be held so as to be rotatable relative to the pressure plate 36 in the circumferential direction, for the purpose of implementing the wear compensation described in more detail below.

In the engaged state of the motor vehicle friction clutch 10, the friction linings 42 of a clutch disk 44 are clamped between the pressure plate 36, i.e., a friction surface 38 thereof, and the flywheel 14, i.e., a friction surface 40 thereof. The clutch disk 44 is conventionally designed and has, for example, a torsional vibration damper 46. It should be noted that any type of clutch disk can be provided in the pressure plate component group 12 according to the invention.

Further, the pressure plate 36 carries a wear readjustment device 48. The wear readjustment device 48 comprises a bolt element 50 which penetrates a through opening 52 in the pressure plate 36. A head section 54 of the bolt element 50 lies in an expanded section 56 of the through opening 52, while a helical compression spring 58, which presses the bolt element 50 toward the side 18 of the housing 16, acts between a bottom of the expanded section 56 of the through opening 52 and the head section 54 of the bolt element 50. The spring 58 can, but does not have to, act in a direction parallel to the rotational axis.

Securely connected to the bolt element 50 is a lever section 60, which interacts, in a radially inner area, with the wear compensation device 30 in a manner described below.

In particular, the lever section 60 engages into a circumferential recess in the ring element 32 and, in the state shown in FIG. 1, rests on the side of the ring element 32 away from the to flywheel 14.

An anti-rotation bolt 62 is attached to the pressure plate 16 radially inside the through opening 52 and engages into an opening 64 in the lever section 60. In this way, an anti-rotation means for the wear readjustment device 48 and, at the same time, for the ring element 32 is provided. An axial pressure force action exerted by the wear compensation device 30 on the lever section 60, and an axial pressure force action exerted by a helical compression spring 66 on the lever section 60 in the same direction as the wear compensation device 30, i.e., away from the flywheel 14, cause the bolt element 50 to be pressed, by tilting in the through opening 52, into a friction clamping seat.

The bolt element 50 also has an end area 68, with which the bolt element 50 penetrates a housing through opening 70 on a side of the housing 16 facing away from the flywheel 14 and thus projects outward in this area over the housing 16. In this end area 68, the bolt element 50 carries a plate 72 that projects radially outward relative to a bolt longitudinal axis L. The plate 72 has a tool support surface or a tool contact surface 74 lying in the direction of the housing 16, which surface 74 is located across from a corresponding housing surface region 76 of the housing 16. Between the tool contact surface 74 and the housing surface region 76, a predetermined distance d is provided in the direction of the bolt longitudinal axis L, as described below.

The function of the motor vehicle friction clutch 10 or pressure plate component group 12 according to the invention is described below.

FIG. 1 shows an engaged state of a pressure-type motor vehicle friction clutch 10, wherein the diaphragm spring 22 presses the pressure plate 36, radially outside via the wear compensation device 30, toward the flywheel 14, so that the friction linings 42 are clamped between the friction surface 38 and the friction surface 40. To disengage the clutch, the diaphragm spring 22, in its radially inner area, is pressed toward the flywheel 14, so that the wear compensation device 30 is relieved by the diaphragm spring 22, while the pressure plate 36, under prestress from tangential leaf springs (not shown), is moved away from the flywheel 14. In this disengaged state, to prevent an unwanted axial expansion of the wear compensation device 30, the lever section 60 rests on the ring element 32, as described above. Because the bolt element 50 is pressed into the friction clamping seat on the pressure plate 36, by the prestress effect of the helical compression spring 66 and the wear compensation device 30, an axial movement of the bolt element 50, and a corresponding axial expansion of the wear compensation device 30, is prevented.

It is known that after a predetermined operating period, i.e., useful life or kilometers travelled, the friction linings 42 experience an amount of wear that can be associated relatively well with this operating period. To compensate for this wear at periodic service intervals, for example, the compensation procedure described below is carried out.

Because there are no components in the pressure plate component group 12 according to the invention that detect the occurrence of wear relative to other components, and because the distance d is established in such a way as to prevent, regardless of the relative movement state between the pressure plate 36 and the housing 16, any contact between the tool contact surface 74 and the housing surface region 76, the bolt element 50 with the lever section 60 is located, even when wear has occurred, in the position relative to the pressure plate 36 shown in FIG. 1. Only the distance d is reduced in keeping with the wear that has occurred and the associated movement of the pressure plate 36 toward the flywheel 14.

To compensate for wear, the clutch 10 is first placed into the disengaged state, as described above. This means that the pressure plate 36, after release by the diaphragm spring 22, is moved back in the direction of the flywheel 14 into a disengagement position, which is not influenced by the state of wear. The distance d is thereby enlarged again by the movement of the pressure plate 36 relative to the housing. In this disengaged state, a screwdriver-type readjustment tool 80 (FIG. 2) with a forked head section 82 is inserted into the area between the tool contact surface 74 and the housing surface region 76, so that the bolt element 50, with its end area 68, enters a recess 84 in the tool 80 that is open on one side. The thickness of the tool 80, i.e., its thickness orthogonal relative to the plane of the drawing in FIG. 2, is selected so as to be less than the distance d that exists in the disengaged state. After the readjustment tool 80 has been inserted into the area between the tool contact surface 74 and the housing surface region 76, the clutch 10 is again placed into the engaged state. This means that the diaphragm spring 22, via the wear compensation device 30, again presses the pressure plate 36 in the direction of the flywheel 14. When this movement occurs, the tool contact surface 74 comes initially to rest on a lateral surface 86 of the tool 80, and thereby takes along the tool 80, until the tool 80 comes to rest with its other surface, not shown in FIG. 2, on the housing surface region 76. Once this state of contact has been established, the bolt element 50 can no longer move with the pressure plate 36 toward the flywheel 14. As a result, when there is ongoing movement of the pressure plate 36 toward the flywheel 14 due to wear on the friction linings 32, the bolt element 50 moves relative to the pressure plate 36, overcoming its friction clamping seat and being compressed by the helical compression spring 58. When this relative movement occurs, the lever section 60 elevates from the ring element 32, which is moving with the pressure plate 36 toward the flywheel 14.

After the engagement procedure, the clutch 10 is again disengaged, i.e., the diaphragm spring 22 again releases the wear compensation device 30, and thus the pressure plate 36, in the axial direction. Because the bolt element 50, together with the lever section 60, has moved relative to the pressure plate 36, as described above, and is again being held in this moved position in a friction clamping seat on the pressure plate 36, and also because an axial space exists in this moved state between the lever section 60 and the ring element 32, it is possible for the wear compensation device 30, when relieved by the diaphragm spring 22, to initially expand in the axial direction. That is, the ring elements 32, 34, which are prestressed relative to each other in the wear compensation direction, slide on each other with their slanted surfaces until the produced axial lengthening of the wear compensation device corresponds to the previously produced movement of the bolt element 50, and thus of the lever section 60. After this axial expansion, the ring element 32 again strikes the lever section 60, after which further axial expansion of the wear compensation device 30 is no longer possible.

If the clutch is then placed again into an engaged state, this engaged state is one wherein the previous wear has been compensated for, and the reduction in the friction lining thickness has been compensated for, by means of the corresponding axial expansion of the wear compensation device 30. This means that during subsequent engagement and disengagement procedures, the diaphragm spring 22 acts in a swivel range such as that which exists in a new clutch without wear. Thus, regardless of the wear state of the friction linings 42, a suitable working area can always be provided for the diaphragm spring 22. Due to the movement of the bolt element 50 relative to the pressure plate 36 that occurs during the wear compensation process, the bolt element 50, after the implementation of wear compensation, is again in a position relative to the housing 16 that corresponds to a position found in the non-worn state of the friction linings. This means that repeated wear compensation procedures can subsequently be carried out with the same tool 80.

An important principle of the pressure plate component group 12 according to the invention is that, in the disengaged state of the clutch, the distance d is at least slightly larger than the thickness of the readjustment tool 80 in the area of its head 82, while in the engaged state, when there is wear to be compensated for, the distance d is smaller than the thickness of the tool 80. As a result, after the tool 80 is inserted, and even before the pressure plate 36 comes to rest on the clutch disk 44, it is possible, by means of the tool 80, to block the bolt element 50 from moving together with the pressure plate 36.

Various modifications of the above-described pressure plate component group 12 are possible. For example, the lever section can be embodied not as a rigid part, but rather as an elastically deformable part with a spring force such that a relaxation initially occurs upon an axial movement of the bolt element 50 relative to the pressure plate 16, i.e., the contact force of the elastically deformable lever section 60 on the ring element 32 is reduced, and a subsequent wear compensation movement of the ring element 32 in the axial direction leads again to a stressing of the lever section 60, until an equilibrium of forces is achieved between the tension force of the lever section 60 and the spring force that prestresses the ring element 32. Furthermore, it is possible to provide only a single ring element rotatable relative to the pressure plate 36, for example, the ring element 32. In this case, the corresponding complementary slanted surfaces lying in the circumferential direction must be provided on the pressure plate 36. The provision of individual wedge elements as compensation elements is also possible.

Because the wear compensation device 30 is embodied with the ring elements 32, 34, a single wear readjustment device 48 is sufficient to prevent an undesired axial expansion of the wear compensation device 30. Specifically, a single lever section 60 can prevent the ring elements 32, 34 from undesired relative rotation due to being forced toward the pressure plate 36. This simplifies the readjustment procedure considerably, because work with the tool 80 is necessary at only one location. It is nonetheless conceivable to provide several such wear readjustment devices 48 distributed in the circumferential direction.

The tool 80 is elastically embodied in its shaft area 88, so as to prevent, upon the introduction of the tool 80 into the area between the tool contact surface 74 and the housing surface region 76, any undefined movement of the bolt element 50 caused by the tilting or slanting of the head section 82.

As FIG. 1 shows, no sections of the wear readjustment device 48 project substantially in the axial direction over the side of the housing 16 that faces away from the flywheel 14. This is possible because a depression 92, in which the end area 68 is substantially completely held, is arranged in the area of the wear readjustment device 48. It is therefore possible to avoid movement of the bolt element 50 when the pressure plate component group 10 is placed on the side of the housing facing away from the side 18.

As FIG. 1 also shows, in the pressure plate component group 12 according to the invention, there are no components of the wear readjustment device 48 that project outward radially over the friction surface 38 of the pressure plate 36 or the clutch disk 44. Furthermore, there are no components of the wear readjustment device 48 that project axially over the friction surface 38 of the pressure plate 36. This permits a very compact embodiment of the pressure plate component group 12 and the motor vehicle friction clutch 10 containing it. This is shown in FIG. 1 by the fact that a cylindrical, axially running section 90 of the housing 16 borders directly radially outside the friction surface 38 of the pressure plate 36 or the radially outer end area of the clutch disk 44, and is then connected to the flywheel 14 in the area of the side 18 of the housing 16.

It should be noted that the wear compensation device 30 does not necessarily have to be arranged in the area between the diaphragm spring 22 and the pressure plate 36. Rather, it is also possible to provide wear compensation by arranging the wear compensation device 30 in the support area of the diaphragm spring 22 on the housing 16. It is then possible to manually implement wear compensation in the same manner as described above.

In the pressure plate component group in FIG. 1, the provision of different tools 80 with different thicknesses in their head areas 82 allows the amount of wear compensation to be adjusted as desired.

Furthermore, an embodiment of a wear readjustment device is possible in which the wear readjustment device comprises, for example, a screw bolt, which is screwed into a threaded opening in the pressure plate directly adjacent to the ring elements 32, 34. The screw bolt, with its head, then acts on the ring element 32, like the lever section 60 in FIG. 1. A through opening must then be provided in the axially aligned area of the housing 16, e.g., for a screwdriver, Inbus tool or the like, so that such a tool can be brought into engagement with a complementary tool contact formation on the screw bolt head. The screw bolt, with its head, then blocks the axial expansion of the wear compensation device. When wear is to be compensated for, turning the screw bolt causes the screw bolt to axially rotate out of the associated threaded opening in the pressure plate to some extent, so that the bolt head elevates from the wear compensation device. Upon a subsequent disengagement process, in which the diaphragm spring releases the wear compensation device, the wear compensation device can expand in the axial direction, until the ring element again strikes the bolt head. Thus, in an embodiment of this type, stepless compensation for wear can be attained by manually turning the screw bolt that constitutes the wear readjustment device. It should be pointed out that a corresponding arrangement is also possible when the wear compensation device is provided in the area between the housing and the diaphragm spring.

The essential and mutually independent principles of the present invention can be summarized as follows:

1. No mechanisms for detecting a state of wear in reference to the relative movement of different components of the pressure plate component group or the motor vehicle friction clutch need to be provided.
2. All components of the pressure plate component group, i.e., of the wear readjustment device, are arranged radially inside an external end area of the friction linings of a clutch disk.
3. There are no components of the wear readjustment device that project axially over the friction surface of the pressure plate.
4. When compensation rings are used in the wear compensation device, the provision of a single wear readjustment device suffices, because this can completely prevent the undesired axial expansion of the wear compensation device. The result is that the manual wear compensation procedure is carried out only on a single wear readjustment device and is thus very simple.

The possibility of manual wear compensation creates many different options for acting on the wear readjustment device to carry out wear compensation, because manual operation or manipulation of the wear readjustment device is subject to significantly fewer limitations than exist in the case of operation or manipulation by, for example, a clearance indicator. Therefore, operating procedures that are not practically feasible with a conventional clearance indicator, or can be implemented only at great structural expense, e.g., the aforementioned rotation of a screw, become possible. This in turn means that the possibility of manual adjustment permits an extremely precise wear compensation function that is practically immune to malfunction to be integrated into a pressure plate component group or a motor vehicle friction clutch.

The invention is not limited by the embodiments described above which are presented as examples only but can be modified in various ways within the scope of protection defined by the appended patent claims.

I claim:

1. A pressure plate component group for a motor vehicle friction clutch having a clutch disk with friction linings, consisting essentially of:

a housing attachable to a flywheel for common rotation around a rotational axis;

a pressure plate arranged in the housing in a rotation-proof manner and axially movable relative to the housing, the pressure plate having a friction surface;

an energy storage device supported between the housing and the pressure plate so as to press the pressure plate toward a first side of the housing;

a wear compensation device arranged in a pressure path of the energy storage device, the wear compensation device having at least one compensation element that is prestressed and movable for wear compensation; and at least one manually operable wear readjustment device having an operating section and readjustment means arranged to interact with the wear compensation device for compensating for wear that occurs during clutch operation on the friction linings of the clutch disk which are clampable between the pressure plate and the flywheel.

2. A pressure plate component group according to claim 1, wherein the energy storage device is a diaphragm spring.

3. A pressure plate group according to claim 1, and further comprising a readjustment tool, the operating section of the wear readjustment device being configured for interaction with the readjustment tool.

4. A pressure plate component group according to claim 1, wherein the compensation element of the wear compensation device is a ring element arranged to surround the rotational axis, the ring element being rotatable around the rotational axis for wear compensation and movable in a direction of the rotational axis.

5. A pressure plate component group according to claim 1, wherein a single wear readjustment device is provided.

6. A pressure plate component group according to claim 5, wherein the at least one wear readjustment device is configured to have substantially no components projecting in an axial direction over the friction surface of the pressure plate toward the first side of the housing.

7. A pressure plate component group according to claim 5, wherein the at least one wear readjustment device is configured to have substantially no components projecting outward in a radial direction relative to the rotational axis over the friction surface of the pressure plate and a radially outer end area of the clutch disk.

8. A pressure plate component group for a motor vehicle friction clutch having a clutch disk with friction linings, comprising:

a housing attachable to a flywheel for common rotation around a rotational axis;

a pressure plate arranged in the housing in a rotation-proof manner aid axially movable relative to the housing, the pressure plate having a friction surface;

an energy storage device supported between the housing and the pressure plate so as to press the pressure plate toward a first side of the housing;

a wear compensation device arranged in a pressure path of the energy storage device, the wear compensation device having at least one compensation element that is prestressed and movable for wear compensation; and at least one manually operable wear readjustment device having an operating section and readjustment means arranged to interact with the wear compensation device for compensating for wear that occurs during clutch operation on the friction linings of the clutch disk which arc clampable between the pressure plate and the flywheel, the at least one wear adjustment device comprising a bolt element which penetrates a through-opening in the pressure plate, the readjustment section including a lever section arranged on the bolt element so as to act on the wear compensation device, whereby the bolt element is prestressed in the through-opening in a friction clamping seat, the through-opening lying substantially radially inside a radially outer end of one of the friction surface of the pressure plate and the friction linings of the clutch disk.

9. A pressure plate component group for a motor vehicle friction clutch having a clutch disk with friction linings, comprising:

a housing attachable to a flywheel for common rotation around a rotational axis;

a pressure plate arranged in the housing in a rotation-proof manner and axially movable relative to the housing, the pressure plate having a friction surface;

an energy storage device supported between the housing and the pressure plate so as to press the pressure plate toward a first side of the housing;

a wear compensation device arranged in a pressure path of the energy storage device, the wear compensation device having at least one compensation element that is prestressed and movable for wear compensation; and at least one manually operable wear readjustment device having an operating section and readjustment means arranged to interact with the wear compensation device for compensating for wear that occurs during clutch operation on the friction linings of the clutch disk which are clampable between the pressure plate and the flywheel, the at least one wear readjustment device comprising a bolt element which penetrates a through-opening in the pressure plate, the readjustment section including a lever section arranged on the bolt element so as to act on the wear compensation device, whereby the bolt clement is prestressed in the through-opening in a friction clamping seat, the housing having a through opening, the bolt element having an end section that penetrates the housing through-opening so as to have an end portion that projects outward over the housing to form at least a part of the operating section, the bolt element in the end portion that projects over the housing having a tool contact formation, the tool contact formation comprising at least one radial projection with a tool support surface lying a direction of the housing whereby a predetermined distance is provided in a bolt longitudinal direction between the tool support surface and an opposed housing surface region.

10. A pressure plate component group according to claim 9, wherein the predetermined distance, in an operating state of the pressure plate component group that corresponds to a disengaged state, is larger than a thickness of a blocking section of a readjustment tool and, in an operating state of the pressure plate component group that corresponds to an engaged state, is smaller than the thickness of the blocking section.

11. A pressure plate component group according to claim 10, wherein the wear adjustment device is configured so that after the operating section is brought into engagement with the readjustment tool, in the operating state of the pressure plate component group that corresponds to a disengaged state, the bolt element is at least partially prevented, by contact of the readjustment tool engaged with the tool contact formation and with the surface region of the housing, from moving with the pressure plate toward the first side of the housing upon a subsequent engagement procedure.

* * * * *